United States Patent [19]

Carter, Jr.

[11] Patent Number: 4,795,886

[45] Date of Patent: Jan. 3, 1989

[54] TEMPERATURE CONTROL IN WHICH THE CONTROL PARAMETER IS THE DEGREE OF IMPERFECTION IN THE IMPEDANCE MATCHING

[75] Inventor: Philip S. Carter, Jr., Palo Alto, Calif.

[73] Assignee: Metcal, Inc., Menlo Park, Calif.

[21] Appl. No.: 943,755

[22] Filed: Dec. 19, 1986

[51] Int. Cl.[4] .............................................. H05B 1/02
[52] U.S. Cl. .................................... 219/505; 219/504; 219/501; 219/494; 219/10.75; 324/58 B
[58] Field of Search ................ 219/501, 497, 499, 494, 219/504, 505, 506, 508, 509, 491, 490, 10.75; 324/58.5 B, 58 B

[56] References Cited

U.S. PATENT DOCUMENTS

| | | | |
|---|---|---|---|
| 3,584,190 | 5/1971 | Marcoux | 219/233 |
| 3,686,460 | 8/1972 | Lamparter et al. | 219/10.77 |
| 3,800,218 | 3/1974 | Shekel | 324/58 B |
| 3,924,102 | 12/1975 | Hanekom | 219/501 |
| 4,002,882 | 1/1977 | McCutchen | 219/499 |
| 4,211,911 | 7/1980 | Dehn | 219/10.55 F |
| 4,499,358 | 2/1985 | Scott | 219/10.77 |
| 4,507,546 | 3/1985 | Fortune et al. | 219/497 |
| 4,546,238 | 10/1985 | Ahs | 219/497 |
| 4,616,120 | 10/1986 | Maruyama et al. | 324/58 B |
| 4,626,767 | 12/1986 | Clappier et al. | 323/280 |

FOREIGN PATENT DOCUMENTS

| | | |
|---|---|---|
| 0087099 | 2/1983 | European Pat. Off. . |
| 2806159 | 1/1980 | Fed. Rep. of Germany . |
| 2527916 | 6/1977 | France . |
| 50-84373 | 7/1975 | Japan . |

OTHER PUBLICATIONS

Low Cost Wideband Dual Directional Coupler, by Robert S. McDonald, pp. 34-36 of the May/Jun. 1982 issue of r.f. design.
Specification Sheet for National Semiconductor MM54C14/MM74C14 Hex Schmitt Trigger, pp. 1-10, 1-11, and 1-12.
Specification Sheet for National Semiconductor MM54C221/MM74C221, Dual Monostable Multivibrator.
Application of William D. Hall, Ser. No. 749,637, filed Jun. 28, 1985, entitled Ferromagnetic Element with Temperature Regulation.
Application of Clappier Ser. No. 684,730, Filed Dec. 21, 1984, entitled Constant Current RF Generator.

Primary Examiner—M. H. Paschall
Attorney, Agent, or Firm—Hall, Myers & Rose

[57] ABSTRACT

A temperature control system is disclosed for controlling heating current to a heater having an impedance which varies substantially with temperature. The change in impedance of the heater changes the degree of mismatch between the power transmission system and the heater resulting in a change in the voltage which is reflected back to the power transmission system. The reflected voltage is monitored and its magnitude compared to a reference source and the power to the heater is controlled in response to this comparison.

21 Claims, 4 Drawing Sheets

Schematic of Equivalent circuit of Soldering tool & Impedance matching circuit

Impedance Vector Diagram for circuit in Fig. 2 where the temperature is in a narrow range around $T_c$

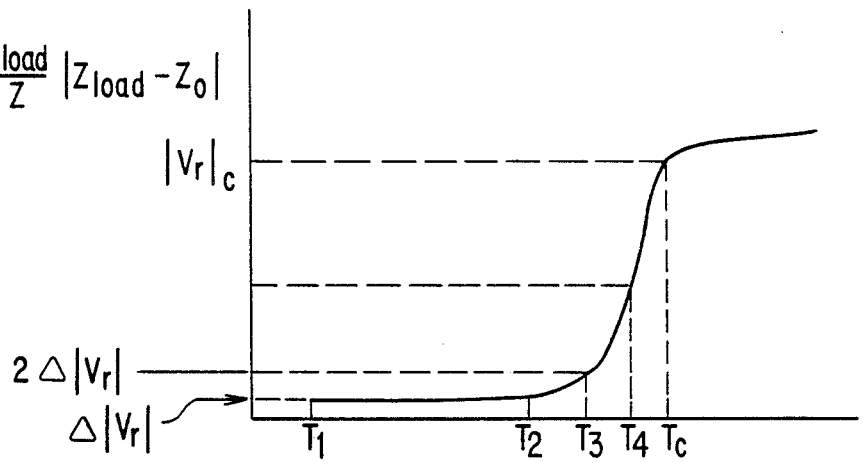
Fig. 4
$$|V_r| = \frac{I_{load}}{Z}|Z_{load} - Z_0|$$
Fig. 5
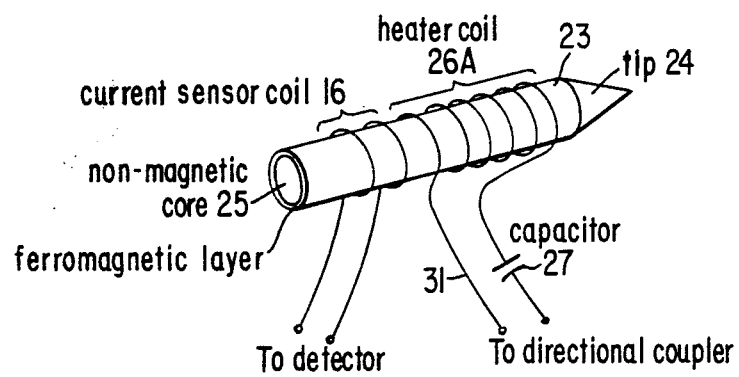
Fig. 6
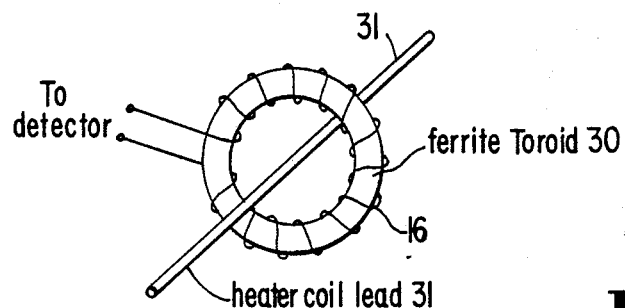
Fig. 7
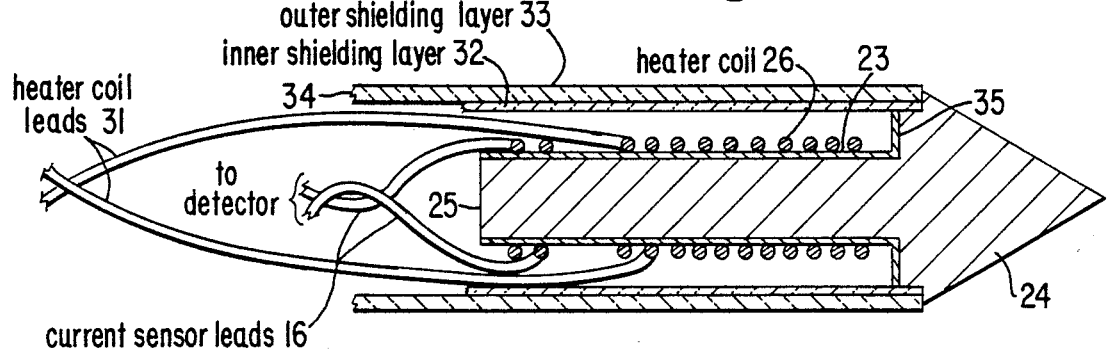

D.C. AMPLIFIER

TEMPERATURE CONTROL IN WHICH THE CONTROL PARAMETER IS THE DEGREE OF IMPERFECTION IN THE IMPEDANCE MATCHING

BACKGROUND OF THE INVENTION

This invention relates particularly to temperature control systems. One use for the invention is the provision of a soldering iron which operates at a relatively constant temperature.

It is well known that a piece of high permeability ferromagnetic material may be held at a relatively constant temperature near its effective Curie temperature if the radio frequency current of proper frequency and magnitude are passed through it. Such a device, however, maintains its temperature constant only over a very limited range of heat power (in watts) extracted from the load. Generally, a typical such device operates at temperatures above the effective Curie when the heat extracted by the load is very low, operates at or near the effective Curie over a very limited range in which heat in watts is extracted from the load, and its temperature falls off sharply as the heat in watts extracted by the load increases above said very limited range.

The very limited range referred to above may be extended by using a composite structure of a ferromagnetic layer clad upon a copper conductor as taught in U.S. Pat. No. 4,256,945, issued Mar. 17, 1981 to Philip S. Carter and John F. Krumme entitled: Alternating Current Electrically Resistive Heating Element Having Intrinsic Temperature Control.

In two later applications I have described such a composite device in which I observed that there was a voltage standing wave ratio (VSWR) in a composite heater of the type such as was described in the aforesaid U.S. Pat. No. 4,256,945. Two such applications are my U.S. patent applications Ser. No. 586,715 (filed Mar. 6, 1984) and Ser. No. 666,346 (filed Oct. 30, 1984) both entitled High Efficiency Autoregulating Heater.

A prior application of Clappier, Ser. No. 684,730 filed Dec. 21, 1984), now U.S. Pat. No. 4,626,767, entitled Constant Current RF Generator, assigned to the same assignee as the present application, mentions the destructive effect on a power supply due to changes in the VSWR due to changes in the load impedance.

The application of William D. Hall, Ser. No. 749,637 (filed June 28, 1985), entitled Ferromagnetic Element With Temperature Regulation, is assigned to the same assignee as the present application. A continuation-in-part application, Ser. No. 003,288 was filed on Jan. 14, 1987, and the parent application abandoned. FIG. 6 of the parent application, teaches (1) means for maintaining a constant RF load current, and (2) a means for switching the RF power off when the temperature of the ferromagnetic heating elements is at, or close to, its Curie temperature. This is accomplished by means of a current sensor which develops an output voltage proportional to the current through the load. The current is higher than necessary to raise the temperatures of the load up to the effective Curie point of the material. The magnitude of voltage across the load decreases as the temperature rises in the neighborhood of the effective Curie Temperature due to the decrease of the load impedance magnitude. A signal is produced which is proportional to the difference between the load voltage and a reference voltage. This difference voltage activates a pulse generator circuit which shuts down the driver circuit 52 for a fixed period of time $t_o$ allowing the heater to cool. After $t_o$, the driver turns on again, thus producing a pulsating RF current in the load.

In some applications, Hall's approach using a pulsed RF generator has a significantly higher electrical efficiency than the non-switching constant current mode of operation of resistance ferromagnetic heater described in said U.S. Pat. No. 4,256,945 patent. In the constant current mode, the heater of U.S. Pat. No. 4,256,945 when "idling" with a small thermal load near the Curie temperature, has a relatively low impedance and therefore presents a large impedance mismatch to the RF generator. This causes the generator to operate at a relatively low efficiency. In an application such as the hand soldering tool, the circuit is operating in this mode for extended periods. Hall's approach, when properly implemented, avoids operation into a badly mismatched load and consequently achieves higher efficiency.

My present invention includes an improvement upon the aforesaid Hall application.

SUMMARY OF THE INVENTION

There are heating devices in which the load impedance varies with the temperature of the load. The aforesaid U.S. Pat. No. 4,256,945 and the aforesaid applications are such devices. Another such prior art device is a heater of a doped barium titanate in which the resistance rises precipitously within a given temperature range, as the temperature rises.

My invention involves supplying a radio frequency heating current to heat the load of a heater whose impedance varies substantially with temperature. The change in impedance of the load changes the degree of mismatch between the power transmission system and the load resulting in a change in the voltage which is reflected back to the power transmission system by the load.

The reflected voltage is sensed and its magnitude is compared to the voltage of a reference source. The difference between the reference source and the reflected voltage is used to turn off the power to the load when the reflected voltage exceeds the reference voltage. The load temperature then drops and the power to the load is restored after a selected predetermined time. The power continues this on-off cycling operation to produce a pulsating current that holds the load temperature relatively constant.

A directional coupler may be employed to isolate the reflected voltage. The isolated reflected voltage is compared with a reference voltage, to produce a difference signal. The power supply is turned on and off depending on the magnitude of the difference signal, thereby producing a pulsating current that holds the load temperature constant as explained above. The reflected voltage is isolated from the power supply.

A modified form has an excellent impedance match at the desired operating temperature. The regulator circuit, holds the temperature constant by holding the reflected voltage at its minimum.

The modifications described in the last paragraph are more expensive than the preferred form described hereinafter in conjunction with FIG. 1. By reason of their added cost they are not regarded as the preferred form.

BRIEF DESCRIPTION OF THE DRAWINGS

FIG. 4 is a graph showing the relation of the reflected voltage (along the Y axis), and the temperature (X-axis).

FIG. 5 is a perspective view of a soldering iron tip, plus a schematic view of the electrical circuit involved.

FIG. 6 is a view of a modified system for the current sensor of FIG. 1.

FIG. 7 is a cross-sectional view of a shielded soldering iron tip which may be employed in place of the heater of FIG. 1.

DETAILED DESCRIPTION OF THE INVENTION

Figure 1:
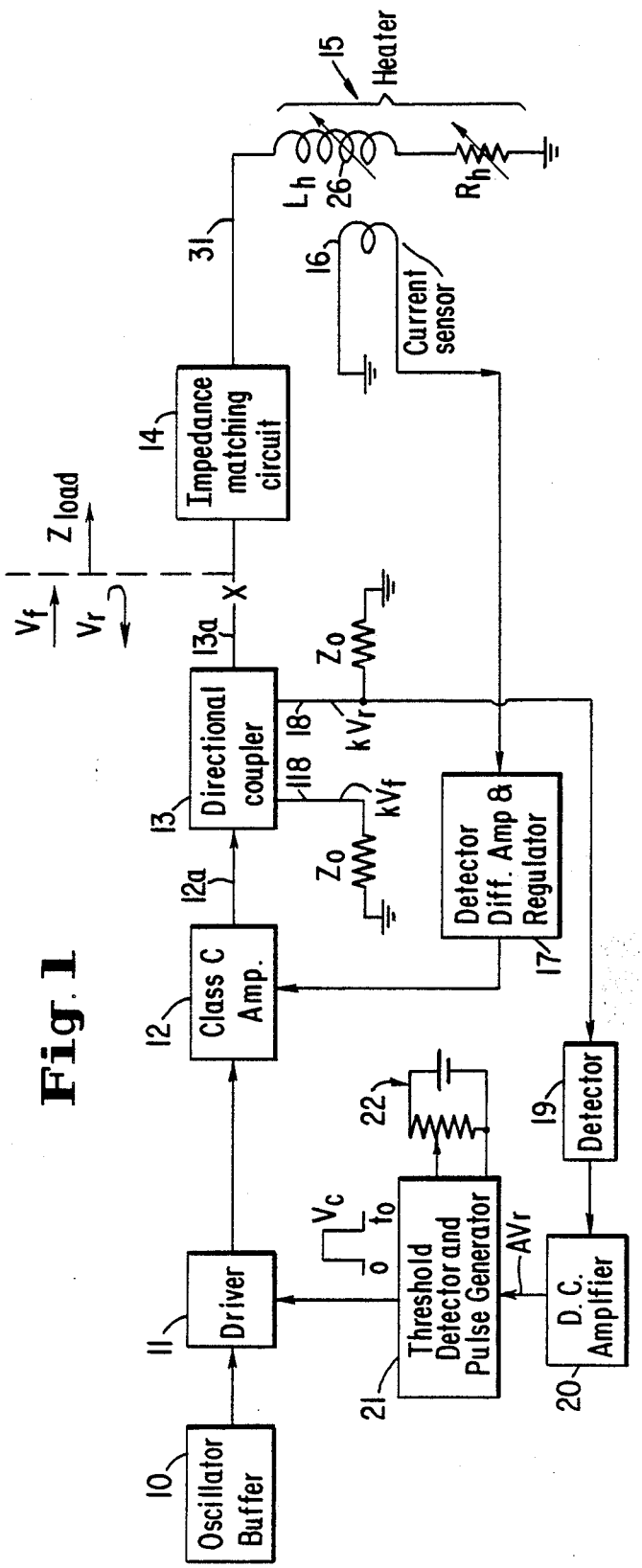
FIG. 1 is a schematic drawing of the preferred form of the invention.

In FIG. 1, a conventional power supply comprises an oscillator and buffer 10, a driver 11 and a Class C amplifier 12. The output of the Class C amplifier, which has a frequency preferably in the range of 13 to 14 MHz, is fed through directional coupler 13 and impedance matching-circuit 14 to the load 15 which comprises a heater composed of high permeability ferromagnetic material with an inductance $L_h$ and resistance $R_h$. As will appear, the current from the Class C amplifier 12 to the load 15 is pulsed on and off. When the current is "on" its magnitude is held constant by the combination of current sensing coil 16 and "Detector, Differential Amplifier and Regulator" 17. When the current to the load exceeds the desired constant magnitude, the voltage induced across coil 16 causes the regulator 17 to decrease the voltage fed to the collector of the final stage of the power supply, $L_h$ namely the Class C amplifier 12. To achieve this function, the detector, differential amplifier and regulator 17 has an adjustable reference voltage against which the voltage across coil 16 is compared. If the voltage across coil 16 exceeds the reference voltage, the regulator 17 lowers the collector voltage to the Class C amplifier 12, until the two voltages are equal. Similarly, if the voltage across coil 16 is lower than the reference voltage, the regulator senses the difference and raises the voltage to the Class C amplifier until the voltage across coil 16 equals the reference voltage. If the Class C amplifier is of the vacuum tube type, the regulator 17 controls the plate voltage of that amplifier.

A directional coupler 13 is employed to sense reflections at the input to the impedance matching circuit 14. The reflected voltage $V_r$ is very small when the temperature of the heater of the heater 15 is well below the effective Curie temperature. This condition i.e., small $V_r$ is obtained by means of the impedance matching circuit 14, the details of which are discussed below. As the temperature approaches the effective Curie temperature of the ferromagnetic heater 15, the resistnce $R_h$ and the inductance $L_h$ of the heater 15 both decrease producing a reflected voltage $V_r$ at the input of the impedance matching circuit 14 and a voltage $KV_r$ at the reflected voltage output port 18 of the directional coupler 13. k is the voltage coupling coefficient of the coupler 13. The coupler reflected voltage $KV_r$ activates the detector 19, D.C. amplifier 20, threshold detector and pulse generator 21 circuits, producing a rectangular voltage $V_c$ of duration $t_o$ and of the appropriate polarity to deactivate, i.e., turn off, the driver 11.

The threshold detector 21 has a selectable threshold voltage 22. When $AV_r$ exceeds the threshold voltage 22 the pulse generator delivers a single pulse $V_c$ which turns the driver 11 off for a fixed, but selectable, time $t_o$. By selecting the threshold voltage 22 one can control the temperature at which the pulse is triggered and thus achieve another useful purpose, i.e. to vary the nominally constant control temperature over a range in the vicinity of the effective Curie temperature. By properly selecting $t_o$, the variation of the nominally constant temperature can be controlled.

The reflected voltage $V_r$ at the input to the impedance matching circuit is given by the equation:

$$V_r = I_{load} (Z_{load} - Z_o)/2 \text{ (Equation 1)}$$

where:
$Z_{load}$=impedance at the input to the impedance matching circuit.
$Z_o$=characteristic impedance of coupler, usually 50 ohms.
$I_{load}$=heater current.

Figure 2:
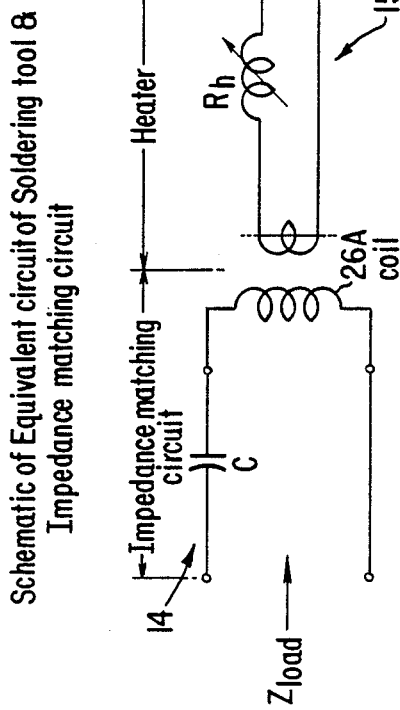
FIG. 2 is a schematic drawing of the impedance matching circuit of FIG. 1.

It is instructive to consider a specific example, for instance the equivalent circuit of a soldering iron, illustrated in FIGS. 2 and 5. In this example the heater 15 is a simple cylinder of magnetic material 23. The heater 23 is hollow and the tip 24 with the non-magnetic core 25 are held by heater 23. Parts 24 and 25 may be in one piece and made of copper. The impedance matching circuit includes a multi-turn coil 26A inductively coupled to the heater 15 (also 23), plus a series capacitor 27. The function of the capacitor 27 is to tune out the inductive reactance of the transformer 26A, 23.

It is understood that the circuit is designed so that at temperature $T_2$ (described later) the circuit elements 14, 15 have their impedances matched at 50 ohms.

Figure 3:
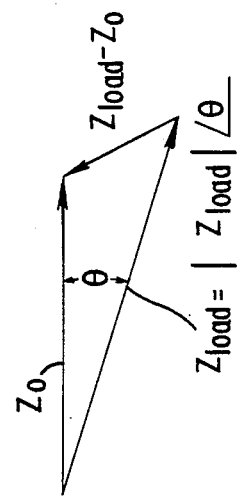
FIG. 3 is the impedance vector diagram for the circuit of FIG. 2 where the temperature is in a narrow range around $T_c$.

In operation, in the circuit of FIG. 1, the coil 26 and the capacitor 27 will be chosen so that at temperature $T_2$, well below the effective Curie temperature, $Z_{load}$ is very nearly equal to 50 ohms and therefore $V_r$ is very small—not large enough to activate the threshold detector 21. As the temperature approaches the effective Curie temperature $Z_{load}$ departs from 50 ohms and the magnitude of $V_r$ increases to a level at which the threshold detector 21 is triggered. In the example selected, the inductance $L_h$ and the resistance $R_h$ of the heater 15 both decrease causing $Z_{load}$ to be capacitive. A vector diagram of the impedance is shown in FIG. 3. The magnitude $|Z_{load}|$ has increased above its value $Z_0$ below the Curie temperature and its phase is now negative. This results in an impedance difference vector $Z_{load} - Z_o$ which generates a reflected voltage vector according to Equation 1.

FIG. 4 illustrates several factors affecting the operation of the system. FIG. 4 shows a plot of the magnitude of the reflected voltage as a function of temperature over a range from ambient $T_1$, through the effective Curie temperature $T_c$. In this illustration we have shown a residual or stray component or reflected voltage $\Delta |V_r|$ at low temperatures which is due either to (1) imperfect matching of the load 15, (2) imperfect directivity of the coupler 13, or a combination of (1) and (2). It is obvious that the threshold detector circuit 21, 22 must be adjusted so as not to be activated by this residual reflected voltage. As the temperature approaches $T_c$, $V_r$ will increase above this residual voltage. The threshold detector 21, 22 can be set to trigger at any temperature in the range perhaps $T_3$ to $T_c$. Thus we have available a range of possible operating temperatures near $T_c$.

Though it is theoretically possible to vary the operating temperature over the entire range from approximately $T_3$ to $T_c$ it is probably desirable to maintain it substantially below the effective Curie tempearature $T_c$ at all times in order to maintain the good amplifier efficiency and stability referred to previously as one of the advantages of this approach. A large value of $V_r$ corresponds to a high degree of mismatch between the Class C amplifier 12 and the load 14, 15. This in turn lowers the efficiency of the amplifier output. Thus operation at temperatures ranging from $T_3$ up to a temperature $T_4$, at which amplifier efficiency and stability are still high, is desirable.

The choice of the RF generator design 10, 11, 12 is subject to many considerations including cost, both inital and operating, weight, size, etc. High efficiency is almost always desirable in an RF generator since size, weight, and cost reductions often result. In general a high efficiency power amplifier, such as Class C amplifier, is usually desirable in the output stage. Recent developments have made it possible to achieve even higher efficiencies than are achievable with the Class C. See, Kraus, Bostian and Raab "Solid State Radio Engineering" Chap. 14, pp. 432–471, John Wiley and Sons, New York 1980. I have not yet determined whether these designs are applicable to this proposal or to our previous heaters.

FIG. 5 shows an impedance matching circuit which consists of a coil 26 surrounding the cylindrical heater 23 plus a series capacitor 27 for tuning the circuit to series resonance at ambient temperature. When a heater according to FIG. 5 is used in FIG. 1, the capacitor 27 is added to FIG. 1 as shown in FIG. 5. This circuit is described more fully in my patent application Ser. No. 666,346, and has been found to operate well in this soldering instrument application.

The regulating circuit described here is useful in applications where the entire heater is in close thermal contact with the object being heated, i.e., the work piece. In this case the good thermal connection between the work piece and the heater produces the same change in temperature over the entire extent of the heater and thus causes the maximum change in $V_r$. The soldering tool described in my U.S. patent application Ser. No. 666,346, is a good example of this type of application since the entire heater is in good thermal contact with the working surface at the tip of the tool. An example of a non-optimum application is a physically and thermally long heater in a situation where more heat is required in some sections of the heater than others. In this case those sections of the heater which require the least heat may produce a large enough value of $V_r$ to turn off the generator. Other parts of the heater which require more heat will be at a lower temperature. This situation can be partially remedied by operating the heater at a current high enough to maintain the hotter parts of the heater close to the effective Curie temperature.

Designs for the directional coupler shown in FIG. 1 are well known and documented. At frequencies in the 1–100 MHz range designs employing ferrite cores are well known. See R. McDonald "Low Cost Wideband Directional Coupler" RF Design pp. 34–36, May/June 1982. Designs employing capacitors and lengths of transmission line are useful at these frequencies and at lower and higher frequencies, since lumped element equivalents of the transmission lines can be used. See C. Y. Ho "Design of Lumped Quadrature Couplers" Microwave Journal pp. 28–31, September 1979. At lower frequencies, below 1 MHz, bridges are very useful, See Dunwoodie and Baxter "Measure Small SWRS With Great Accuracy" Microwaves, June 1978.

FIG. 1 employs an inductive loop or winding 16 as a current sensor. One possible implementation of this sensor coil is shown in FIG. 5 for the case of the soldering tool (shown in FIG. 5, without the shielding enclosure). In this illustration the heater coupling or impedance matching coil 26A and the current sensor coil 16 are both wound around the ferromagnetic heater layer 23. Another possibility is shown in FIG. 6 where a ferrite torrid 30 is wound with the sensor pickup coil 16, a heater coil lead 31 being passed through the torrid. Toroidal current sensors of this type are well known and commercially available, for instance Pearson Electronics, Inc., Model 410.

I use the term "effective Curie" to refer to the temperature below the published Curie temperature, at which the temperature of the ferromagnetic element will remain substantially constant.

Instead of the load 15 being a ferromagnetic element such as 23, the load 15 may be any electrical conductor whose impedance changes when the temperature thereof changes, for example a doped barium titanate conductor.

Instead of turning current on and off for controlling the temperature of the load 15, the apparatus may be designed to simply reduce the current.

On some applications RF shielding is required to prevent the leakage and radiation of the electromagnetic field into the space outside the heater. This requirement and means for achieving it have been presented and described in the patent application of Carter and Krumme Ser. No. 243,777 filed Mar. 16, 1981, a continuation-in-part of the U.S. Pat. No. 4,256,945 of Carter and Krumme. This problem was also dealt with in the application of John F. Krumme Ser. No. 430,317 entitled "Autoregulating Electrically Shielded Heater" filed on Sept. 30, 1982. Finally a description of a shielding arrangement which is appropriate for use in connection with the heater shown in FIG. 5 is described in the patent application of Carter, Ser. No. 666,346 C-I-P to application Ser. No. 586,715. FIG. 7 shows in a cross sectional view the essential features of a shield which is applicable to the heater shown in FIG. 5. This shield comprises a two layer tube having an inner shielding layer 32 and an outer shielding layer 33. The inner shielding layer is composed of a high permeability ferromagnetic conducting material which remains magnetic at all time. This inner layer, the thickness of which should be at least one skin depth serves two functions simultaneously. The first is to substantially decrease the current which is induced in the outer shielding layer by the current flowing in the heater coil. This prevents the outer shielding layer from causing a short circuiting action on the heater. The second function is of course to contribute to the shielding action. The outer shielding layer 33 may be either magnetic or non-magnetic. It is preferably a relatively low thermal conductivity nonmagnetic material such as a Series 300 stainless steel. Very good shielding can be obtained at 10 MHz with an inner shield layer which is two thousandths of an inch thickness of 1010 steel and an outer layer which is five thousandths of an inch thickness of a Series 300 stainless steel. The outer layer tube 33 can be extended past 34 to enclose the heater coil and detector leads as far as desired, probably to a connector interface.

At 35 a washer shaped extension to the heater layer 23 may be added. This washer contributes to the heating and prevents large short circuiting currents from being induced in the low resistivity material 24 with which it is in electrical contact.

Figure 8:
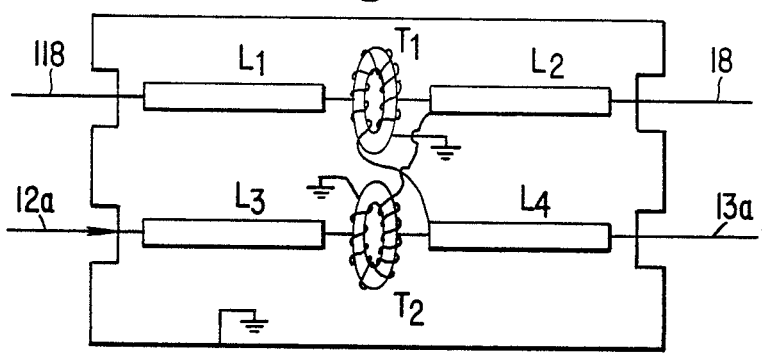
FIG. 8 is a schematic diagram of the directional coupler 13 of FIG. 1.
Figure 9:
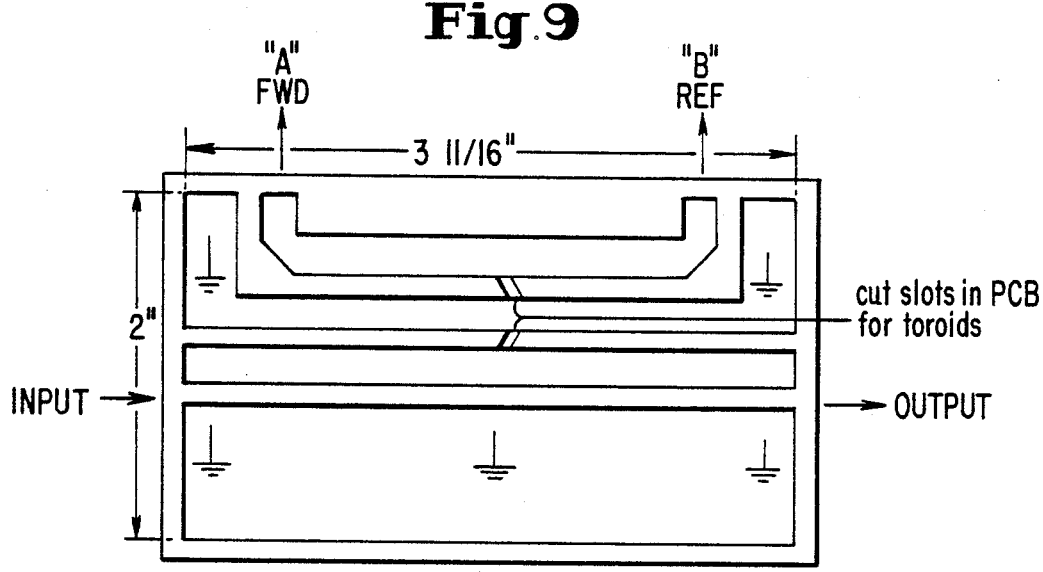
FIG. 9 is a layout diagram of the directional coupler 13 of FIG. 1.

The directional coupler 13 is shown in more detail in FIGS. 8 and 9. It is essentially the same device that is described on pages 34–36 of the May-June issue of the magazine "r.f. design," which is incorporated by reference as showing directional coupler 13. A copy of this magazine article is being filed with this application.

A directional coupler is a device which samples RF current and voltage flowing in one direction but is insensitive to current and voltage flow in the reverse direction. Directional couplers are very old and well known and any of many designs are equally good as a component of my invention.

The schematic of a simple dual directional coupler is given in FIGS. 8 and 9. Two inexpensive toriod transformers $T_1$ and $T_2$ in the lines $L_1$–$L_2$, and $L_3$–$L_4$, respectively, provide inductive coupling. The unit is built on a printed circuit board which provides the necessary microstrips $L_1$, $L_2$, $L_3$ and $L_4$. The toroids $T_1$ and $T_2$ are not coupled to each other. When voltage is reflected by the load 15 it appears on wire 13a, and current flows through lines $L_4$–$L_3$ inducing voltage in toroid $T_2$ which is connected via line $L_2$ to output 18. Also reflected voltage on wire 13a passes current through the coil of toroid $T_1$ inducing current in the circuit 118, $L_1$, $L_2$, 18. The two signals thus fed to output 18 combine to produce a voltage proportional "to" the reflected voltage, assuming correct design of the components.

Figure 11:
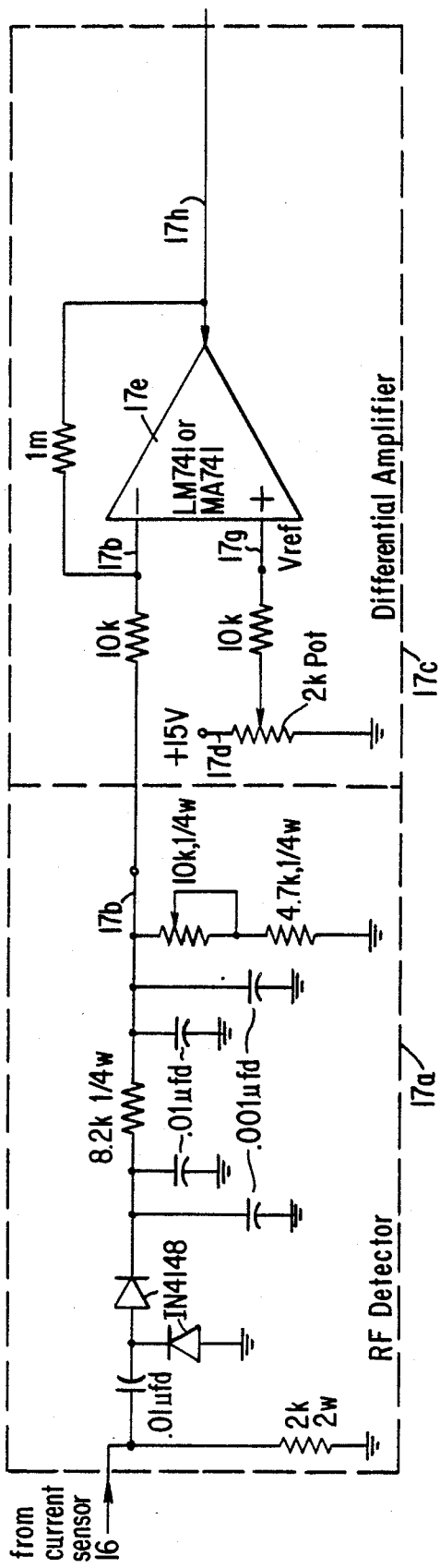
FIG. 11 is a schematic diagram of part of the circuit of the Detector, Differential Amplifier and Regulator of FIG. 1.

I will next describe added details of the Detector, Differential Amplifier and Regulator 17 of FIG. 1. This block 17 performs three functions. The first of the three functions is that of an r.f. detector which will detect the signals from sensor 16. Assuming that the output 12a of Class C amplifier 12 operates at the preferred frequency of 13.56 MHz, the r.f. detector 17a would also operate at that frequency. A schematic of the r.f. detector is shown in block 17a of FIG. 11. The d.c. output 17b of the r.f. detector 17a is fed to differential amplifier 17c. The differential amplifier 17c has a 2000 ohm potientiometer 17d for providing a d.c. reference voltage against which the output 17b of the r.f. detector 17 may be compared. A differential amplifier 17e has input 17f for the voltage at output 17b and input 17g for the reference voltage. The differential amplifier 17e may be Fairchild Model MA 741 or National Semiconductor Model LM 741. The output of the differential amplifier 17e has a voltage that is proportional to the difference between the input voltage 17f and the reference voltage 17g. If these two voltages are *exactly* equal, the output voltage at 17h is zero. However, in our case a finite voltage is required to operate the voltage regulator which in turn controls the output of the Class C amplifier. If the reference voltage at 17g is suddenly increased the output of the differential amplifier suddenly increases. This in turn causes the output of the Class C amplifier to increase, and the output of the current 16 and the voltage at 17b to increase, reducing the difference between the voltages at 17f and 17g to a value at which this difference voltage amplified by the gain of the amplifier exactly equals the output votage at 17b. Since the voltage gain of the amplifier can be quite high, e.g. 500, this difference or "error" voltage can be quite small. Thus the reference voltage at 17g and the equilibrium voltage at 17f which is proportional to the load current, are very nearly equal and constant. A similar progression of events occurs when the reference voltage at 17g is reduced, producing a corresponding reduction in the Class C amplifier output and a corresponding reduction of the current in the heater to a level at which the voltage at 17f is nearly 17g.

The output 17h feeds a conventional voltage regulator, for example National Semiconductor LM350K which in turn raises or lowers the collector voltage of the Class C amplifier 12 as necessary to keep the voltage across sensor 16 constant. In other words the current fed to heater 15 is held constant.

Figure 10:
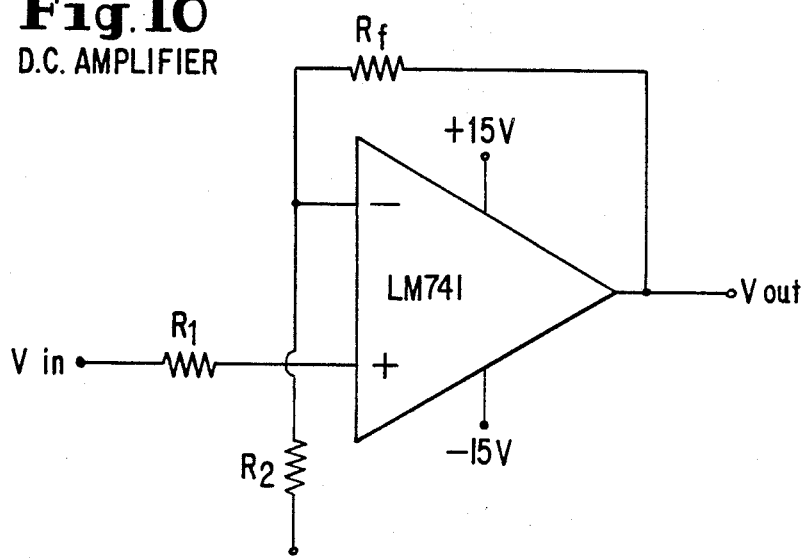
FIG. 10 is a schematic diagram of the D.C. Amplifier 20 of FIG. 1.

A typical example of the DC Amplifier 20 is shown in FIG. 10. The gain of the amplifier is selectable using the design equations as follows:

$$R_1 = \frac{R_f R_2}{R_f + R_2}$$

Figure 12:
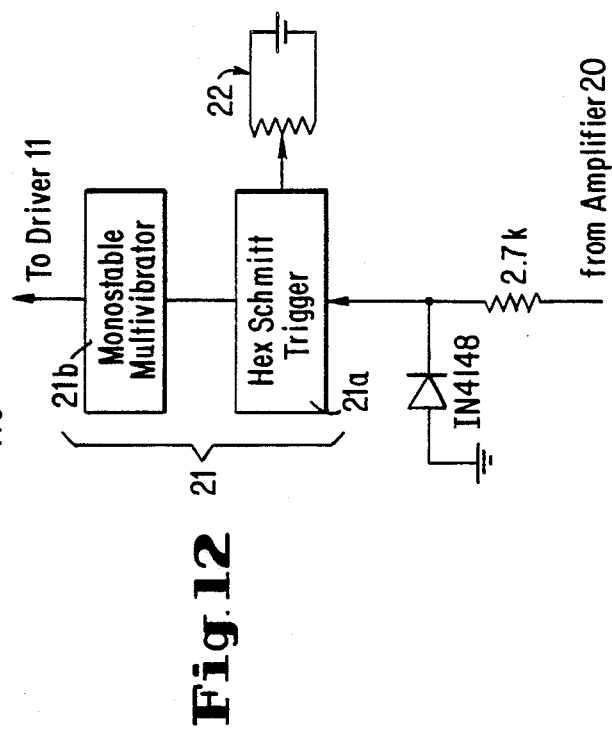
FIG. 12 is a detailed diagram of block 21 of FIG. 1.

The apparatus of block 21 is essentially made of three components as shown in FIG. 12. The first component is made up of a 2.7K resistor and a 1N 4148 diode. This circuit insures that only positive voltages appear at the input of the Hex Schmitt trigger. The second circuit is a threshold detector 21a. It receives the signal from directional coupler output 18, which is then detected by detector 19, amplified by d.c. amplifier 20, compares it to a reference voltage, and produces an output when the signal exceed the reference voltage. The reference voltage source 22 is shown in FIGS. 1 and 12. There are commercially available devices that will perform the stated comparison, for example the National Semiconductor MM 54C14/MM74C14 Hex Schmitt Trigger manufactured by National Semiconductor. A copy of the specification sheet for this device is being filed with this application.

When the reflected voltage signal from output 18 produces a voltage that exceeds the reference voltage from circuit 22, the Schmitt trigger produces an output signal which actuates a monostable multivibrator 21b which produces an output signal $V_c$ of a predetermined length, $t_o$. $V_c$ can turn off the driver transistor by using it to bias the base of a common emitter amplifier stage.

The monostable multivibrator 21b may be National Semiconductor Dual Monostable Multivibrator MM54C221/MM74C221. This device enables the duration of the output signal $V_c$ to be adjusted to the desired time $t_o$. The output signal $V_c$ will shut off driver 15 to cool. If the cooling load on the heater 15 is a heavy cooling load (for example the soldering iron tip is in contact with a cool copper conductor) the cooling will be much greater than if there is very little cooling load on the heater 15. If the cooling load on heater 15 is very small the reflected voltage at output 18 will cause the multivibrator 21b to emit a signal to driver 11 for a time period $t_o$ when the effective Curie of heater 15 is reached. Since the cooling load is small the heater 15 may still be at the effective Curie when time period $t_o$ expires in which event the driver and Class C amplifier will be turned back on, but since there would then still be a reflected voltage at output 18 the mulitvibrator would be turned back on almost instantly starting a new off period for a time period $t_o$. Thus, the radio frequency power to heater 15 would be cycled on and off with the "off" periods being relatively long as compared to the "on" periods.

On the other hand if the cooling load was large the same events would occur except that there would be greater cooling of heater 15 during the time periods $t_o$, and the "off" periods would usually be shorter than the "on" periods.

The exact relation of on and off intervals depends on the cooling load, the selected time period $t_o$, and the magnitude of the current in heater 15.

With this arrangement of this invention, the magnitude of the current fed to the soldering iron (heater 15) may be much larger than it would be in the case of Carter-Krumme U.S. Pat. No. 4,256,945. This is a great advantage as it enables the soldering iron to come up to operating temperature fast when it is first turned on. Moreover, there are serious power losses with the device of said Carter-Krumme patent. Due to the changes of load impedance when the soldering iron passes from the condition where most of the current is in the magnetic layer to the condition where most of the current is in the copper, there is an impedance matching problem. This arises since the load impedance changes and the impedance cannot easily be matched to both conditions. With the present application, the mismatch in the impedance is much smaller that with the Carter-Krumme U.S. Pat. No. 4,256,945 resulting in greater efficiency.

I claim:

1. In a temperature regulator:
   a device having an electrical impedance which varies as the temperature of the device varies over a specified region of its temperature range,
   means for applying pulsating current to said device to heat the same, said means having an impedance which is mismatched with the impedance of said device over at least part of the range over which the impedance of said device varies as a result of temperature change, whereby as the temperature of said device varies over said region the extent of mismatch of the impedances also changes,
   said means further comprising means for producing a signal indicative of reflected power that varies as a function of the impedance mismatch, and
   control means responsive to said signal for varying said pulsating current in order to regulate the temperature of said device.

2. A temperature regulator as defined in claim 1 in which said device is a ferromagnetic element whose permeability changes with temperature to thereby change the impedance of the device to said pulsating current when its temperature changes.

3. A temperature regulator as defined in claim 1, in which said device comprises a doped barium titanate resistance element.

4. A temperature regulator as defined in claim 1 in which said device is a non-magnetic device which has a substantial temperature coefficient of resistance.

5. In a temperature regulator as defined in claim 1, in which said responsive means controls said current to said device to hold the temperature of said device substantially constant.

6. In a temperature regulator as defined in claim 1, said responsive means repeatedly turning the current to said device on and fully off to provide a pulsating current to said device, the energy of which is varied to the extent necessary to hold the temperature of said device substantially constant.

7. In a temperature regulator as defined in claim 6 in which said control means includes a reference voltage and means for comparing the reflected voltage with said reference voltage and also includes means for controlling said temperature in accordance with said comparison.

8. In a temperature regulator as defined in claim 7, means for holding the current to said device constant when it is on.

9. In a temperature regulator as defined in claim 1 in which said responsive means repeatedly turns the current on and off, said responsive means including means for holding the current off for a determinable and variable time during each off period.

10. The method of controlling the temperature of a load comprising,
    providing the load with an electrical component having an impedance that changes with the temperature of the load,
    feeding the load with alternating current and producing a signal created by any impedance mismatch at the load, and
    detecting said signal and varying the amplitude of said current in response to changes in the magnitude of said signal to thereby control the temperature of said load.

11. The method of claim 10 in which said signal is a reflected voltage and in which the amplitude of the current to the load is varied to hold said reflected voltage substantially constant to thereby hold the temperature of the load substantially constant.

12. The method of claim 11 in which said reflected voltage is held constant by comparing it with a reference voltage and varying said current to keep the reflected and reference voltages equal.

13. The method of claim 12 in which said reference voltage is varied to vary the operating temperature of the load.

14. The method of claim 12 in which the following series of events repeatedly occurs: said current to the load is turned off when said reflected voltage reaches equality with said reference voltage and when the load cools to a predeterminable extent the current to the load is restored.

15. The method of claim 13 in which the current is a pulsating current which intermittently goes on and off to hold the load temperature substantially constant.

16. The method of claim 14 in which said load is provided with magnetic properties so that its impedance to said current varies with changes in the temperature of the load.

17. The method of claim 15 in which the periods of time during which the current is off are substantially equal.

18. The method of claim 15 in which each off period is for a predetermined time.

19. A device having an electrical impedance which varies with variations in temperature of the device,
    means for supplying pulsating current to said device to heat the same and comprising a source of radio frequency current, an impedance matching device between said source and said device for at least approximately matching the impedance of said device to said source, whereby there is a reflected voltage that has a magnitude dependent on the degree of mismatch, said means having an impedance which is mismatched with the impedance of said device over at least part of the range over which the impedance of said device varies, whereby as the temperature of said device changes the extent of mismatch of the impedances also changes, and control means being responsive to the magnitude of said reference voltage to at least reduce the current supplied by said source to the load in response to one amount of mismatch, said current being restored in response to another amount of mismatch, whereby the current to said device changes to control the temperature of said device.

20. In a temperature regulator as defined in claim 19 or claim 6 or claim 9 wherein said device includes a ferromagnetic material heated by said alternating current to a temperature approaching the Curie temperature of said ferromagnetic material.

21. In a temperature control a ferromagnetic element having a permeability above 100 when said element is well below its effective Curie temperature and a permeability of about unity near its effective Curie, and means for feeding said element with pulsating current, said first-named means producing a voltage that increases when the temperature of said element increases and approaches said effective Curie temperature, said first-named means including means for detecting when said voltage increases to a selected threshold and for at least reducing the magnitude of said current when said threshold is reached, with said current being restored to its former value when said element cools, whereby said current occurs in a series of pulses of a length and spacing that will hold the temperature of said element substantially constant.

* * * * *